United States Patent
Khiterer et al.

(10) Patent No.: US 12,388,134 B2
(45) Date of Patent: *Aug. 12, 2025

(54) LITHIUM ION CONDUCTING PROTECTIVE FILM AND METHOD OF USE

(71) Applicants: SAMSUNG ELECTRONICS CO., LTD., Suwon-si (KR); MASSACHUSETTS INSTITUTE OF TECHNOLOGY, Cambridge, MA (US)

(72) Inventors: Mariya Khiterer, Cambridge, MA (US); Paula T. Hammond, Newton, MA (US); Sun Hwa Lee, Cambridge, MA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/980,682

(22) Filed: Nov. 4, 2022

(65) Prior Publication Data

US 2023/0055631 A1  Feb. 23, 2023

Related U.S. Application Data

(60) Continuation of application No. 16/722,212, filed on Dec. 20, 2019, now Pat. No. 11,502,357, which is a
(Continued)

(51) Int. Cl.
*H01M 12/08* (2006.01)
*H01M 4/02* (2006.01)
(Continued)

(52) U.S. Cl.
CPC ............. *H01M 12/08* (2013.01); *H01M 4/02* (2013.01); *H01M 4/134* (2013.01);
(Continued)

(58) Field of Classification Search
CPC ............. H01M 50/449; H01M 50/457; H01M 50/451; H01M 50/414–431;
(Continued)

(56) References Cited

U.S. PATENT DOCUMENTS 5,061,581 A  10/1991 Narang et al.
5,075,156 A  12/1991 Tanaka et al.
(Continued)

OTHER PUBLICATIONS

Seo, Jinhwa et al., "Effect of the Layer-by-Layer (LbL) Deposition Method on the Surface Morphology and Wetting Behavior of Hydrophobically Modified PEO and PAA LbL Films," Langmuir, vol. 24, No. 15, 2008, pp. 7995-8000.

*Primary Examiner* — Eugenia Wang
(74) *Attorney, Agent, or Firm* — CANTOR COLBURN LLP

(57) ABSTRACT

A lithium ion conducting protective film produced using a layer-by-layer assembly process. The lithium ion conducting protective film is assembled on a substrate by a sequential exposure of the substrate to a first poly(ethylene oxide) (PEO) layer including a cross-linking silane component on the first side of the substrate, a graphene oxide (GO) layer on the first PEO layer, a second poly(ethylene oxide) (PEO) layer including a cross-linking silane component on the GO layer and a poly(acrylic acid) (PAA) layer on the second PEO layer. The film functions as a lithium ion conducting protective film that isolates the lithium anode from the positive electrochemistry of the cathode in a lithium-air battery, thereby preventing undesirable lithium dendrite growth.

16 Claims, 5 Drawing Sheets

Related U.S. Application Data division of application No. 15/637,180, filed on Jun. 29, 2017, now Pat. No. 10,535,908, which is a continuation of application No. 14/099,794, filed on Dec. 6, 2013, now Pat. No. 9,705,167.

(60) Provisional application No. 61/836,760, filed on Jun. 19, 2013.

(51) Int. Cl.

| | | |
|---|---|---|
| *H01M 4/134* | (2010.01) | |
| *H01M 4/1395* | (2010.01) | |
| *H01M 4/36* | (2006.01) | |
| *H01M 4/62* | (2006.01) | |
| *H01M 50/409* | (2021.01) | |
| *H01M 50/411* | (2021.01) | |
| *H01M 50/414* | (2021.01) | |
| *H01M 50/42* | (2021.01) | |
| *H01M 50/431* | (2021.01) | |
| *H01M 50/451* | (2021.01) | |
| *H01M 50/457* | (2021.01) | |
| *H01M 50/46* | (2021.01) | |

(52) U.S. Cl.
CPC ......... *H01M 4/1395* (2013.01); *H01M 4/366* (2013.01); *H01M 4/62* (2013.01); *H01M 50/409* (2021.01); *H01M 50/411* (2021.01); *H01M 50/414* (2021.01); *H01M 50/42* (2021.01); *H01M 50/431* (2021.01); *H01M 50/451* (2021.01); *H01M 50/457* (2021.01); *H01M 50/46* (2021.01); *Y02E 60/10* (2013.01)

(58) Field of Classification Search
CPC ........ H01M 12/08; H01M 4/62; H01M 4/366; H01M 4/13; H01M 4/134; H01M 4/1395
See application file for complete search history.

(56) References Cited

U.S. PATENT DOCUMENTS

| | | |
|---|---|---|
| 6,277,514 B1 | 8/2001 | Ying et al. |
| 6,485,866 B1 | 11/2002 | Gauthier et al. |
| 7,799,467 B2 | 9/2010 | Delongchamp et al. |
| 8,219,140 B2 | 7/2012 | Jacobs et al. |
| 2004/0248009 A1 | 12/2004 | De Jonghe et al. |
| 2006/0123622 A1 | 6/2006 | Guy |
| 2007/0129792 A1 | 6/2007 | Picart et al. |
| 2008/0005852 A1 | 1/2008 | Hu et al. |
| 2008/0050641 A1* | 2/2008 | Dressick ............. H01M 4/8807 502/182 |
| 2009/0197138 A1 | 8/2009 | Hammond et al. |
| 2010/0055564 A1 | 3/2010 | Tokunaga et al. |
| 2011/0177401 A1 | 7/2011 | Crowther et al. |
| 2012/0027837 A1 | 2/2012 | Demuth et al. |
| 2012/0058355 A1 | 3/2012 | Lee et al. |
| 2012/0088163 A1 | 4/2012 | Ryu et al. |
| 2013/0309571 A1 | 11/2013 | Yoon et al. |
| 2014/0072884 A1 | 3/2014 | Zhang et al. |
| 2014/0186724 A1 | 7/2014 | Hammond et al. |
| 2014/0377670 A1 | 12/2014 | Khiterer et al. |
| 2017/0365900 A1 | 12/2017 | Khiterer et al. |

* cited by examiner

LITHIUM ION CONDUCTING PROTECTIVE FILM AND METHOD OF USE

CROSS-REFERENCE TO RELATED APPLICATIONS

This application is a continuation of U.S. patent application Ser. No. 16/722,212, filed on Dec. 20, 2019, which is a divisional of U.S. patent application Ser. No. 15/637,180, filed on Jun. 29, 2017, and issued as U.S. Pat. No. 10,535,908, which is a continuation of U.S. patent application Ser. No. 14/099,794, filed on Dec. 6, 2013, and issued as U.S. Pat. No. 9,705,167, both applications entitled "Lithium Ion Conducting Protective Film and Method of Use," and both applications claiming priority to U.S. Provisional Patent Application Ser. No. 61/836,760, filed on Jun. 19, 2013, entitled "Siloxane-Crosslinked Tetralayer LbL Films as Li Anode Protective Barriers," the contents of which in their entirety are herein incorporated by reference.

TECHNICAL FIELD

An embodiment relates in general to a lithium ion conducting protective film, and more particularly, for a conducting protective film for a lithium anode that insures the electrical characteristics of the Li-Air battery for extended operation.

BACKGROUND

Lithium (Li)-Air electrochemical cells and batteries have some of the highest theoretical energy storage capacities in the energy storage technology field. Lithium-air batteries have a theoretical energy of around 3000 Wh/kg (watt hours per kilogram) which is approximately 10 times greater than that of lithium ion batteries. Additionally, Li-Air electrochemical cells are environmentally safe and have better stability than lithium ion batteries. As such, improvements in lithium-air batters are being actively developed.

Generally, Li-Air electrochemical cells include an anode (negative electrode) which includes lithium metal, an oxygen gas diffusive cathode (positive electrode) and an electrolyte having a lithium ion conductive medium positioned between the anode and the cathode. The oxidation of lithium at the anode and the reduction of oxygen at the cathode induce a current flow in the electrochemical cell.

However, during the discharge and recharge operation of the battery, there are several factors that decrease the specific energy of Li-Air batteries, such as Li dendrite growth and oxygen/water based degradation of the lithium metal. Dendrites are lithium deposits that form on the surfaces of the electrodes of the electrochemical cell which may continue to grow until they cause an internal short circuit, resulting in battery failure. Additionally, the growth of passive surface layers on the anode as a result of the presence of oxygen and water create resistance to lithium ion flow, thereby reducing the energy available from the Li-Air battery.

As a solution to the problems described above, lithium-air batteries that use non-aqueous as well as aqueous electrolytes have included an electrolyte separator that provides a barrier between the electrodes. The separator is typically a ceramic separator, such as a ceramic lithium ion conductor, that provides isolation of the lithium anode in a Li-Air battery to prevent degradation of the lithium anode and dendrite growth. While ceramic protective membranes are good ionic conductors, moisture barriers and Li dendrite suppressors, they suffer from the disadvantage of adding bulk to the battery. In addition, ceramic lithium ion conductors are not stable in contact with lithium, and as such, a polymer or gel electrolyte is required as an additional separator, adding complexity and cost to the battery.

Accordingly, there is a need in the art for a protective film for the lithium anode of a lithium-air electrochemical cell that provides lithium ion conductivity across the film, but which also prevents degradation of the lithium anode and inhibits lithium dendrite growth in the electrochemical cell.

SUMMARY

An anode protective barrier film described herein aims at eliminating such factors as Li dendrite growth and oxygen/water based degradation of the lithium metal in a lithium-air electrochemical cell.

A lithium ion conducting protective film produced using a layer-by-layer assembly process. The lithium ion conducting protective film includes a substrate including a first side and a second side, at least one tetralayer disposed on the first side of the substrate, the at least one tetralayer comprising, a first poly(ethylene oxide) (PEO) layer including a cross-linking silane component disposed on the first side of the substrate, a graphene oxide (GO) layer disposed on the first PEO layer, a second poly(ethylene oxide) (PEO) layer including a cross-linking silane component disposed on the GO layer and a poly(acrylic acid) (PAA) layer disposed on the second PEO layer.

The lithium ion conducting protective film of the present invention may be incorporated into a lithium-air electrochemical cell to isolate the lithium anode from the positive electrochemistry of the cathode in a lithium-air battery, thereby preventing undesirable lithium dendrite growth. The lithium ion conducting protective film of the present invention offers excellent barrier properties and chemical stability without the added volume and weight associated with a ceramic separator. Additionally, the lithium ion conducting protective film of the present invention is thin and flexible and exhibits a high degree of customization due to the polymeric component of the film which allow for enhance chemical stability and tunable physical properties.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

Figure 1:
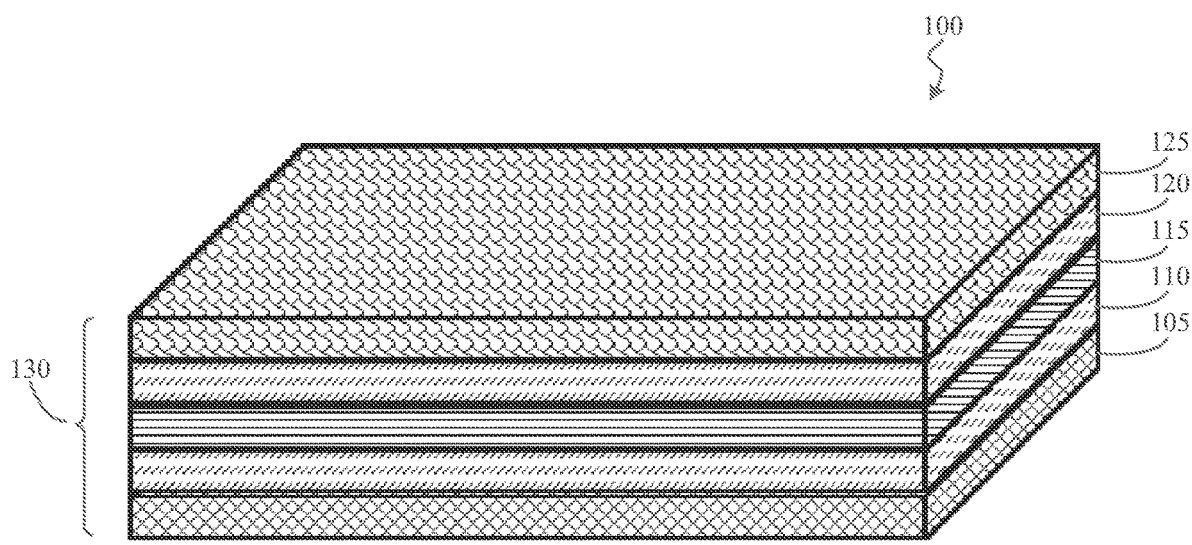
FIG. 1 is a diagram illustrating the layer-by-layer lithium ion conducting protective barrier in accordance with an embodiment of the present invention.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In other instances, well-known devices are shown in block diagram form to avoid obscuring the present application. In the following description of the embodiments, substantially the same parts are denoted by the same reference numerals.

The term "battery" and "electrochemical cell" are herein used interchangeably. However, the term "battery" technically may more properly define a combination of two or more electrochemical cells. The teachings herein that are applicable to a single electrochemical cell are also applicable to each cell of a battery containing multiple electrochemical cells.

Generally, the present invention provides a lithium ion conducting protective film prepared using a layer-by-layer assembly process. The lithium ion conducting protective film includes both a lithium ion conduction component and a barrier component. The lithium ion conduction component provides a lithium ion conduction path through the film and the barrier component imparts lithium dendrite growth suppression properties to the film. The layers of the lithium ion conducting protective film are cross-linked to impart mechanical and chemical stability, as well as improved resistance to moisture and gas permeability. In a particular embodiment, the lithium ion conducting protective film of the present invention may be employed as a protective barrier for the lithium anode of a lithium-air battery or electrochemical cell.

The layer-by-layer assembly process produces ultrathin, pinhole-free films. Layer-by-layer film deposition involves alternating adsorption of soluble or dispersible components that exhibit complimentary interactions to the substrate and each other. In this manner, films can be deposited by dip, spin and spray coating from solutions of polycations, polyions, positively and negatively charged particles or micelles and components that interact via hydrogen or covalent bonding.

Layer-by-layer films generally grow linearly and thickness can be precisely controlled. This technology allows the incorporation of chemical functionalities into a single membrane that are otherwise incompatible via physical blending.

Additionally, nanostructured films can be obtained using nanoparticles, nanorods and nanosheets as layer-by-layer components.

With reference to FIG. 1, in accordance with the present invention, a lithium ion conducting protective film 100 is prepared by a layer-by-layer assembly process for use in a lithium-air electrochemical cell. The lithium ion conducting protective film includes a lithium anode protective layer, a lithium ion conductive layer and a cross-linking silane component between the lithium anode protective layer and the lithium ion conductive layer to cross-link the lithium anode protective layer and the lithium ion conductive layer of the film.

In a specific embodiment, the lithium ion conducting protective film includes a substrate including a first side and a second side 105 and at least one tetralayer 130 disposed on the first side of the substrate 105. The at least one tetralayer 130 further includes, a first poly(ethylene oxide) (PEO) layer 110 including a cross-linking silane component disposed on the first side of the substrate 105, a graphene oxide (GO) layer 115 disposed on the first PEO layer 110, a second poly(ethylene oxide) (PEO) layer 120 including a cross-linking silane component disposed on the GO layer 115 and a poly(acrylic acid) (PAA) layer 125 disposed on the second PEO layer 120.

In one embodiment, the substrate 105 may be a poly (propylene) based membrane. However, this is not meant to be limiting and other membranes that would be appropriate substrates for the formation of the lithium ion conducting protective film 100 are within the scope of the present invention. Any substrate that is porous and compatible with lithium-Air battery conditions is within the scope of the present invention.

In an alternate embodiment, the order of the layers of the lithium ion conducting protective film may be varied. In the exemplary embodiment, the first layer disposed on the first side of the substrate 105 is the first poly(ethylene oxide) (PEO) layer 110 because the substrate is a poly(propylene) based substrate and as such, the PEO layer 110 will adsorb to the substrate better than the GO layer 115 or the PAA layer 125. However, it is within the scope of the present invention to utilize a different substrate have different characteristics that would be better suited to a different layered ordering of the tetralayers of the film.

The incorporation of the first PEO layer 110 including a cross-linking silane component disposed on the first side of the substrate 105 and the second PEO layer 120 including a cross-linking silane component disposed on the GO layer 115 into the layer-by-layer film provides the lithium ion conduction path for the lithium anode of the lithium-air cell. The incorporation of the silane component into the PEO layers 110, 120 establishes a siloxane cross-linking (Si—O—Si) within the layer-by-layer film. The siloxane cross-linking imparts mechanical and chemical stability as well as improved resistance to moisture and gas permeability of the layer-by-layer film. The first PEO layer 110 and the second PEO layer 120 may further include a lithium salt, such as lithium bis(oxalate)borate, to improve the layer-by-layer deposition process and the lithium ion conductivity of the resulting film.

The incorporation of the graphene oxide (GO) layer 115 between the first PEO layer 110 and the second PEO layer 120 provides a barrier component within the lithium anode protective layer which imparts lithium dendrite growth suppression properties. The GO layer 115 is incorporated in the film 100 to impart barrier properties, which arise from the tortuous path created by the overlapping GO layers 115 in a film 100 comprising a plurality of tetralayers 130.

The poly(acrylic acid) (PAA) layer 125 disposed on the second PEO layer 120 is utilized as a supporting polyelectrolyte for the layer-by-layer film growth. The poly(acrylic acid) (PAA) layer 125 may further include a lithium salt, such as lithium bis(oxalate)borate, to improve the layer-by-layer deposition process and the lithium ion conductivity of the resulting film.

During the layer-by-layer process, the cross-linking component is incorporated into the PEO solution process prior to deposition of the PEO layers. Silane is also commonly known as organofunctional trialkoxysilane. In one embodiment, the cross-linking silane component is a monofunctional silane. Monofunctional silanes are characterized as having one Si atom with three alkoxy groups in the molecule. Bifunctional silanes are characterized as having two Si atoms, each with three alkoxy groups. In an additional embodiment, the cross-linking silane component is a bifunctional silane. In another embodiment, the cross-linking silane component is a multifunctional silane. In a specific embodiment, the cross-linking silane component is trialkoxysilane or trichlorosilane. The PEO functionalized silanes are effective in cross-linking the layer-by-layer structure through siloxane-bond formation.

The lithium ion conducting protective film 100 of the present invention may include a plurality of tetralayers 130, each of the tetralayers comprising a first poly(ethylene oxide) (PEO) layer 110 including a cross-linking silane component disposed on the first side of the substrate 105, a graphene oxide (GO) layer 115 disposed on the first PEO layer 110, a second poly(ethylene oxide) (PEO) layer 120 including a cross-linking silane component disposed on the GO layer 115 and a poly(acrylic acid) (PAA) layer 125 disposed on the second PEO layer 120.

Figure 2:
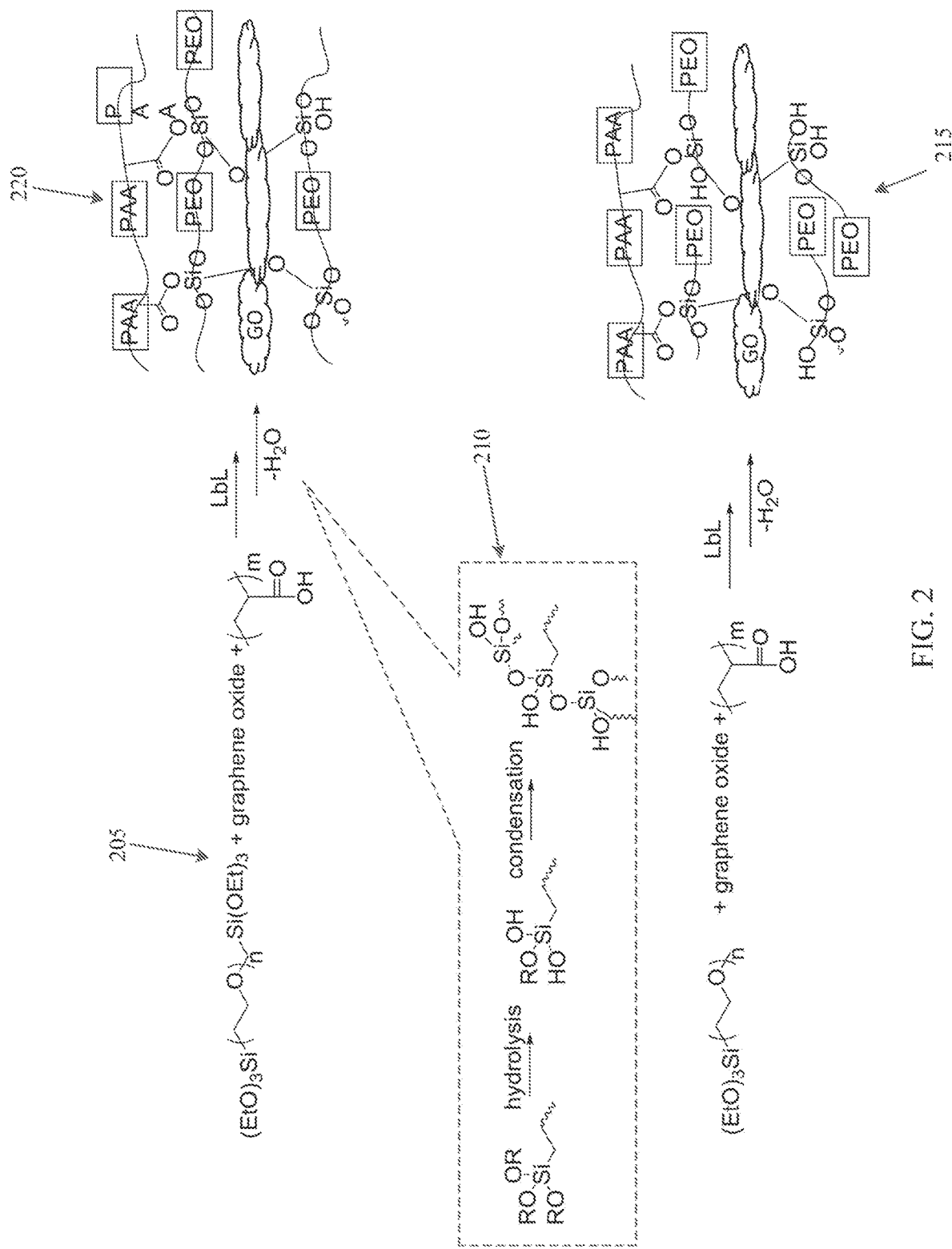
FIG. 2 is a diagram illustrating the chemical structure of the lithium ion conducting protective barrier in accordance with an embodiment of the present invention.

With reference to FIG. 2, the siloxane cross-linking of the layer-by-layer film of the present invention is illustrated. Silanes can function as mediators and promote adhesion between the layers in the layer-by-layer film. To be able to act as adhesion agents in the interface between the layers, the silanes must first be hydrolyzed (activated) and condensed 210. In an aqueous solution, the alkoxy groups of the silane react with water to form reactive, hydrophilic, acidic silanol groups, Si—OH and release free alcohols as side products. The functional groups in the layer-by-layer assembly process utilizing a monofunctional silane 200 dissolved in the first PEO layer 110 and the second PEO layer 120 results in a lithium ion conductive protective film 215 incorporating a monofunctional silane 200 to establish siloxane cross-linking within the layers of the layer-by-layer film. The functional groups in the layer-by-layer assembly process utilizing a bifunctional silane 205 dissolved in the first PEO layer 110 and the second PEO layer 120 results in a lithium ion conducting protective film 220 incorporating a bifunctional silane 205 to provide siloxane cross-linking within the layers of the layer-by-layer film.

In the present invention, the chemical cross-linking of the lithium ion conducting protective layer-by-layer film 215, 220 is an alkoxysilane hydrolysis and condensation process. The Si—OCH2CH3 groups are first converted to Si—OH groups when exposed to moisture or acid/base (i.e. carboxylic acid groups of the poly(acrylic acid)) PAA. These Si—OH groups then condense with other Si—OH or other hydroxyl groups (i.e. hydroxyls on GO and terminal hydroxyls of PEO) to lose a water molecule and form an O—Si—O bond. This process occurs at a slower rate under ambient conditions and at a faster rate under vacuum and/or heated conditions. In addition, Si—OH groups condense with unhydrolyzed Si—OCH2CH3 to lose an ethanol and form an O—Si—O bond once again. Finally, Si—OH and Si—OCH2CH3 can also condense with carboxylic acids of PAA to form COO—Si—O bonds. In this manner, the entire tetralayer can be crosslinked with Si—O to PEO, GO, and PAA. Additional mechanical strength is garnered from the network that forms with O—Si—O bonds between the silanes themselves.

Figure 3:
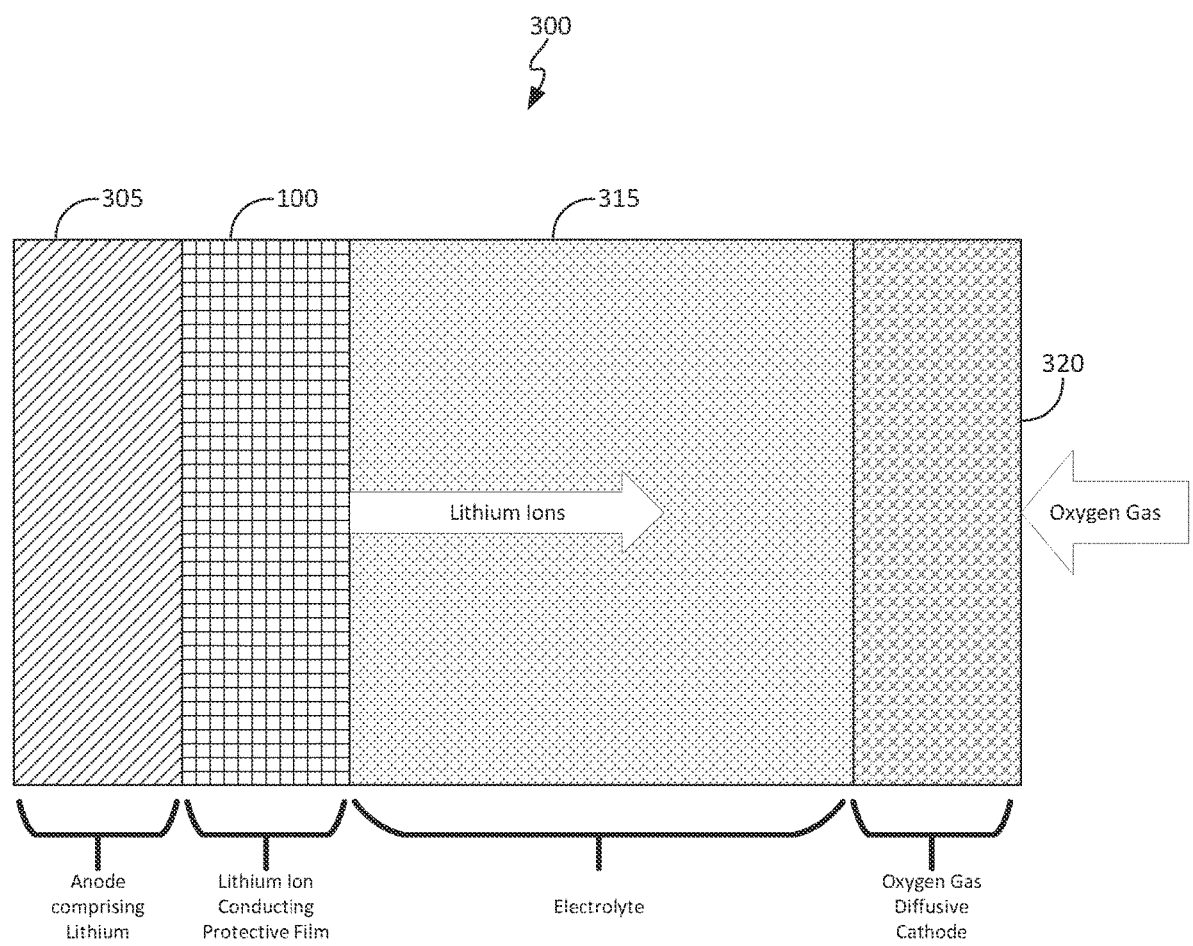
FIG. 3 is a diagram illustrating a lithium-air (Li-Air) electrochemical cell in accordance with an embodiment of the present invention.

With reference to FIG. 3, a lithium-air electrochemical cell 300 in accordance with the present invention includes an anode comprising lithium 305, an oxygen gas diffusive cathode 320, a lithium conducting electrolyte 315 interposed between the anode 305 and the cathode 320 and a lithium ion conducting protective film 100 interposed between the anode 305 and the electrolyte 315. In a specific embodiment, the lithium ion conducting protective film is in direct contact with the lithium anode to maximize its dendrite suppression potential.

The lithium ion conducting protective film 100 of the present invention includes chemical cross-linking that results in a network which will impart mechanical and chemical stability as well as improve the moisture resistance and gas permeability of the film 130. As previously described, the lithium ion conducting protective film 130 of the present invention includes a substrate including a first side and a second side 105 and at least one tetralayer 130 disposed on the first side of the substrate 105. The at least one tetralayer 130 further includes, a first poly(ethylene oxide) (PEO) layer 110 including a cross-linking silane component disposed on the first side of the substrate 105, a graphene oxide (GO) layer 115 disposed on the first PEO layer 110, a second poly(ethylene oxide) (PEO) layer 120 including a cross-linking silane component disposed on the GO layer 115 and a poly(acrylic acid) (PAA) layer 125 disposed on the second PEO layer 120.

In a particular embodiment, oxygen gas diffusive cathode 320 may comprise porous carbon. However, this is not intended to be limiting and other oxygen gas diffusive cathodes known in the art are within the scope of the present invention. Any cathode that includes a high surface area, mesoporosity, and oxygen reduction efficiency is within the scope of the present invention. In an exemplary embodiment, the cathode may be comprised of carbon, metal oxide (such as $Fe_2O_3$, NiO, CuO, $Co_3O_4$) or based upon a noble metal.

The electrolyte 315 of the electrochemical cell 300 may be an aqueous electrolyte or a non-aqueous electrolyte as the lithium ion conductive medium. The non-aqueous electrolyte may be, for example, an organic solvent including a lithium salt. The aqueous electrolyte may be, for example, water including a salt. In a particular embodiment, the lithium conducting electrolyte comprises dimethoxyethane-lithium bis(trifluoromethanesulfonyl)imide. However, this is not intended to be limiting and other electrolytes known in the art are within the scope of the present invention.

In operation of the electrochemical cell 300, the lithium conducting protective film 100, positioned between the lithium anode 305 and the electrolyte 315, provide both a lithium ion conducting component necessary for the operation of the battery and a barrier component that imparts lithium dendrite growth suppression properties. The lithium ion conducting protective film 100 isolate the lithium anode 305 from the positive electrochemistry of the cathode 320, thereby preventing dendrite growth and reducing oxygen and moisture exposure.

Figure 4:
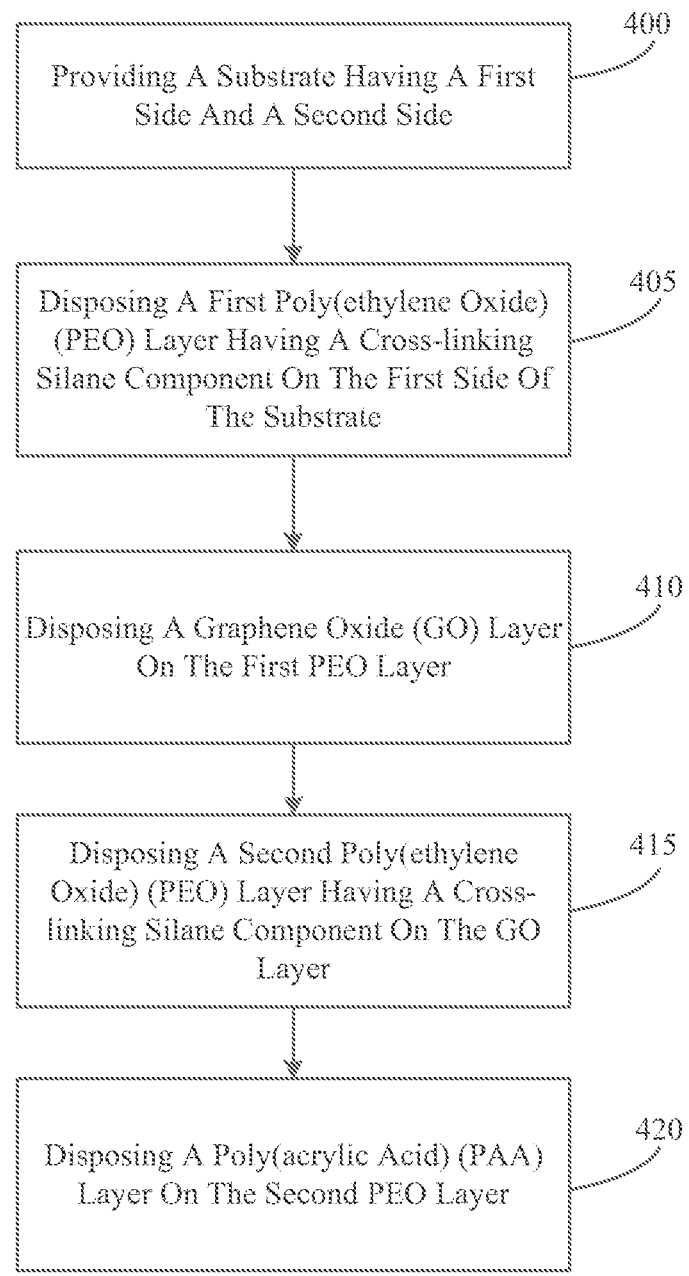
FIG. 4 is a flow diagram illustrating a method of preparing the layer-by-layer lithium ion conducting protective barrier in accordance with an embodiment of the present invention.

With reference to FIG. 4, a method of preparing a layer-by-layer lithium ion conducting protective film 100 in accordance with the present invention is illustrated. The method includes providing a substrate including a first side and a second side 400 and disposing at least one tetralayer on the first side of the substrate, wherein disposing at the at least one tetralayer further includes, disposing a first poly(ethylene oxide) (PEO) layer including a cross-linking silane component on the first side of the substrate 405, disposing a graphene oxide (GO) layer on the first PEO layer 410, disposing a second poly(ethylene oxide) (PEO) layer including a cross-linking silane component on the GO layer 415 and disposing a poly(acrylic acid) (PAA) layer on the second PEO layer 420.

In a particular embodiment, the layer-by-layer lithium ion conducting protective film 100 is prepared by dip coating from polymer solutions onto a substrate 105. In a particular embodiment, the first poly(ethylene oxide) (PEO) layer 110 including a cross-linking silane component may be disposed on the first side of the substrate 105 by dipping the substrate 105 into a solution comprising water, PEO, silane and lithium salt. The salt is added to the PEO solution to aid in the lithium ion conduction of the film and to provide a level of electrostatic charge screening, which improves the deposition of the film. In addition, the pH of the solution may be adjusted to be within a range of approximately 2-3 to strengthen the interaction between the layers through electrostatics and hydrogen bonding. In a specific embodiment, the pH of the solution may be adjusted to approximately 2.5.

Following the deposition of the first PEO layer 110 on the substrate 105, the graphene oxide (GO) layer 115 may be disposed on the first PEO layer 110 by dipping the substrate into a solution comprising GO.

Following the deposition of the GO layer 115, the second poly(ethylene oxide) (PEO) layer 120 including a cross-linking silane component may be disposed on the GO layer 115 by dipping the substrate into a solution comprising water, PEO, silane and lithium salt. The salt is added to the GO solution to aid in the lithium ion conduction of the film and to provide a level of electrostatic charge screening, which improves the deposition of the film. In addition, the pH of the solution may be adjusted to be within a range of approximately 2-3 to strengthen the interaction between the layers through electrostatics and hydrogen bonding. In a specific embodiment, the pH of the solution may be adjusted to approximately 2.5.

Following the deposition of the second poly(ethylene oxide) (PEO) layer 120, the poly(acrylic acid) (PAA) layer 125 may be disposed on the second PEO layer 120 by dipping the substrate into a solution comprising water, PAA and lithium salt. The salt is added to the solution to aid in the lithium ion conduction of the film and to provide a level of electrostatic charge screening, which improves the deposition of the film. In addition, the pH of the solution may be adjusted to be within a range of approximately 2-3 to strengthen the interaction between the layers through electrostatics and hydrogen bonding. In a specific embodiment, the pH of the solution may be adjusted to approximately 2.5. In a specific embodiment, the substrate is rinsed twice in an aqueous rinse solution between each new layer deposition. This process may be repeated to prepare a lithium ion conducting protective film 100 including a plurality of tetralayers 130 on the substrate 105.

In the layer-by-layer formation of the ion conducting protective film 100, the cross-linking PEO-silane component is incorporated by dissolving the silane in the PEO dipping solution at various concentrations (0-100 mol % relative to PEO). The cross-linking density can be varied by adjusting the concentration of silane in the PEO dipping solution. As such, the cross-linking density can be varied to achieve optimal barrier properties, while still maintaining a low film resistance. The resistance of the ion conducting protective film 100, measured in the presence of an electrolyte (dimethoxyethane/lithium bis(trifluoromethanesulfonyl)imide) for both monofunctional and bifunctional silanes is illustrated with reference to FIG. 5.

In the exemplary embodiment, the cross-linking component is dissolved in the PEO dipping solution because the molecular structure of the cross-linking component is compatible with PEO. However, in an additional embodiment, the cross-linking component may be incorporated into the GO or the PAA dipping solution. In general, the cross-linking component may be incorporated into any of the dipping solutions involved in the layer-by-layer process that are compatible with the cross-linking component.

Figure 5:
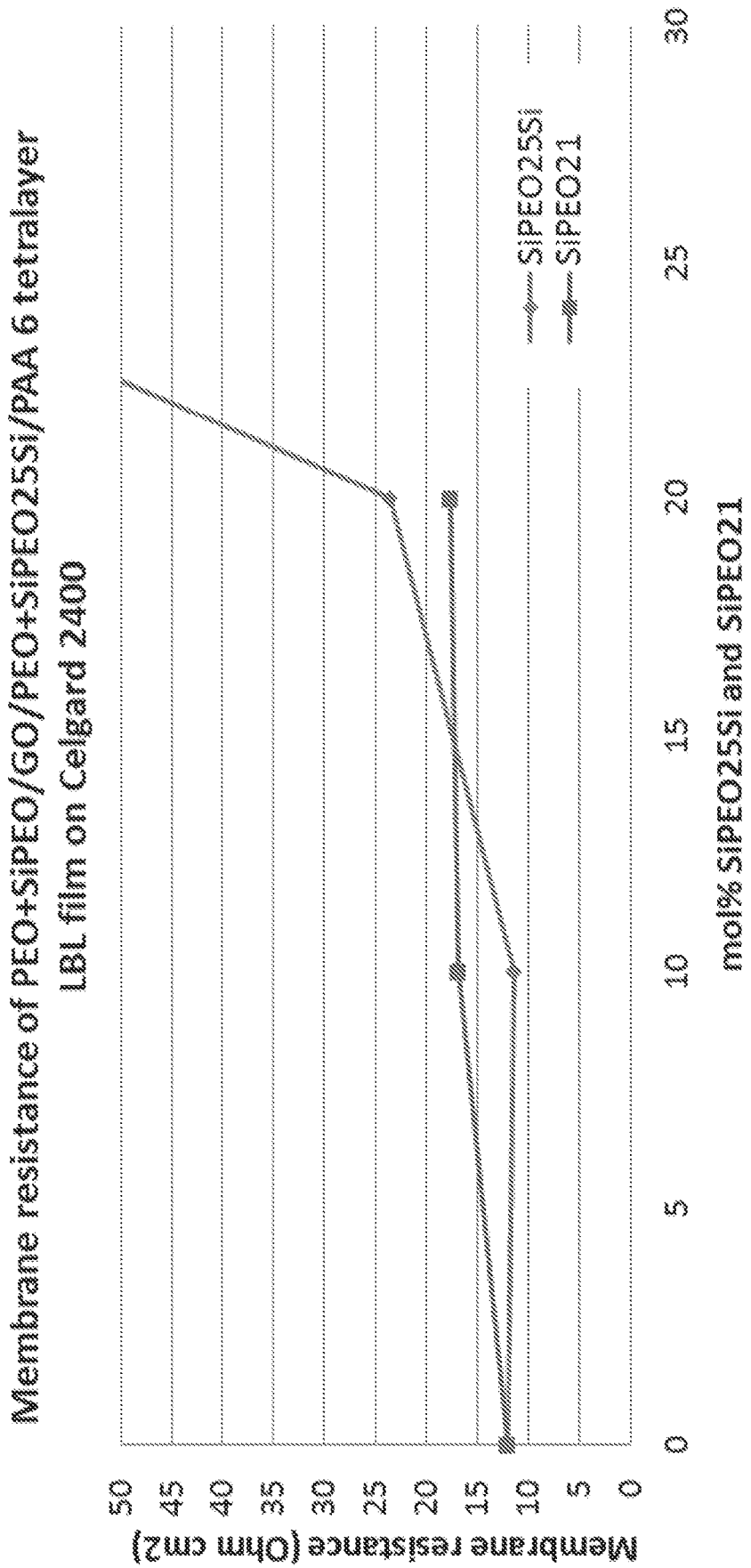
FIG. 5 is a graph illustrating the resistance of the ion conducting protective barrier in accordance with an embodiment of the present invention for two different silane concentrations.

As illustrated in FIG. 5, the resistance of the film increased with cross-link density, but was well below 50 Ohm $cm^2$ for 10 and 20 mol % monofunctional and bifunctional silane-PEOs. When the concentration of the bifunction PEO-silane was increased to 50 mol %, the resistance of the film increased to 340 Ohm $cm^2$. As such, it is shown that the cross-linking density can be varied by adjusting the concentration of silane dissolved in PEO, while still maintaining an acceptable film resistance.

In an alternative embodiment, the cross-linking of the lithium ion conducting film may be accomplished utilizing components other than silane. In a particular embodiment, polyelectrolytes containing amine or simple diamines may be used, with the cross-linking established through amide bond formation with poly(acrylic acid).

As such, the present invention utilizes a layer-by-layer assembly process to provide a composite film that functions as a lithium ion conducting protective film that isolates the lithium anode from the positive electrochemistry of the cathode in a lithium-air battery, thereby preventing undesirable lithium dendrite growth. The lithium ion conducting protective film of the present invention offers excellent barrier properties and chemical stability without the added volume and weight associated with a ceramic separator. Additionally, the lithium ion conducting protective film of the present invention is thin and flexible and exhibits a high degree of customization due to the polymeric component of the film which allow for enhance chemical stability and tunable physical properties. In addition to the use of the lithium ion conducting protective film in lithium-air batteries, the improved barrier properties of the lithium ion conducting protective film make it useful in general packaging applications.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

What is claimed is:

1. A method of preparing a lithium-air electrochemical cell, the method comprising:
   preparing a lithium ion conducting protective film;
   disposing a lithium conducting electrolyte between an anode comprising lithium and an oxygen gas diffusive cathode; and
   disposing the lithium ion conducting protective film between the anode and the electrolyte,
   wherein preparing the lithium ion conducting protective film comprises:
      providing a lithium anode protective layer comprising a graphene oxide layer;
      providing a lithium ion conductive layer; and
      introducing a cross-linking component to cross-link between the lithium anode protective layer and the lithium ion conductive layer of the lithium ion conducting protective film;
      disposing at least one tetralayer on a first side of a substrate, wherein disposing at the at least one tetralayer further comprises:
         disposing a first poly (ethylene oxide) (PEO) layer including the cross-linking component on the first side of the substrate;

disposing the graphene oxide (GO) layer on the first PEO layer;

disposing a second poly (ethylene oxide) (PEO) layer including the cross-linking component on the GO layer; and disposing a poly (acrylic acid) (PAA) layer on the second PEO layer.

2. The method of claim 1, wherein disposing the first poly (ethylene oxide) (PEO) layer including the cross-linking component on the first side of the substrate further comprising, exposing the substrate to a poly (ethylene oxide) (PEO) solution including the cross-linking component.

3. The method of claim 2, wherein preparing the lithium ion conducting protective film further comprises dissolving the cross-linking component in the poly (ethylene oxide) (PEO) solution prior to exposing the substrate to the poly (ethylene oxide) (PEO) solution.

4. The method of claim 2, wherein preparing the lithium ion conducting protective film further comprises dissolving lithium bis(oxalate) borate in the poly (ethylene oxide) (PEO) solution prior to exposing the substrate to the poly (ethylene oxide) (PEO) solution including a cross-linking component.

5. The method of claim 1, wherein disposing the graphene oxide (GO) layer on the first PEO layer further comprises, exposing the first PEO layer to a graphene oxide solution.

6. The method of claim 1, wherein disposing the second poly (ethylene oxide) (PEO) layer including the cross-linking component on the GO layer further comprises, exposing the GO layer to the poly (ethylene oxide) (PEO) solution including the cross-linking component.

7. The method of claim 1, wherein disposing a poly (acrylic acid) (PAA) layer on the second PEO layer further comprises, exposing the second PEO layer to a poly (acrylic acid) (PAA) solution.

8. The method of claim 7, further comprising dissolving lithium bis(oxalate) borate in the poly (acrylic acid) (PAA) solution prior to exposing the second PEO layer to a poly (acrylic acid) (PAA) solution.

9. The method of claim 1, further comprising disposing a plurality of tetralayers on the first side of the substrate.

10. The method of claim 1, wherein the cross-linking component is selected from the group consisting of monofunctional silane, bifunctional silane, multifunctional silane, trialkoxysilane and trichlorosilane.

11. The method of claim 1, wherein preparing the lithium ion conducting protective film comprises crosslinking Si-O to graphene oxide.

12. The method of claim 1, wherein the cross-linking component comprises a polyelectrolyte containing amide groups formed by the reaction of amine or diamine functional groups with carboxylic acid functional group.

13. The method of claim 1, wherein the oxygen gas diffusive cathode comprises porous carbon.

14. The method of claim 1, wherein the lithium conducting electrolyte is an aqueous electrolyte.

15. The method of claim 1, wherein the lithium conducting electrolyte is a non-aqueous electrolyte.

16. The method of claim 1, wherein the lithium conducting electrolyte comprises dimethoxyethane-lithium bis(trifluoromethanesulfonyl) imide.

* * * * *